W. A. LAWRENCE.
PROCESS OF SEPARATING RUBBER LIKE GUM FROM ITS VEGETABLE SOURCE.
APPLICATION FILED APR. 6, 1906.
982,373.
Patented Jan. 24, 1911.
2 SHEETS—SHEET 2.
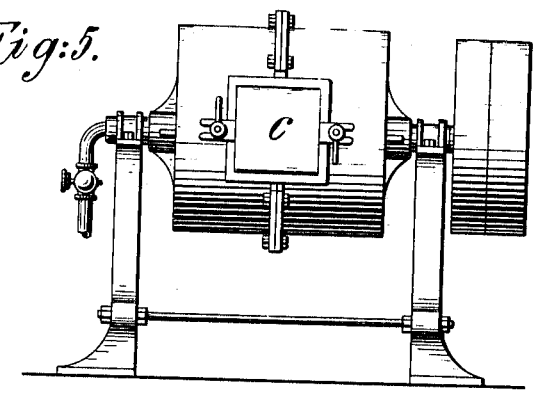
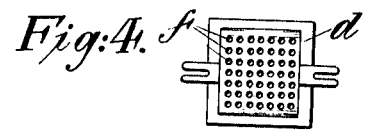
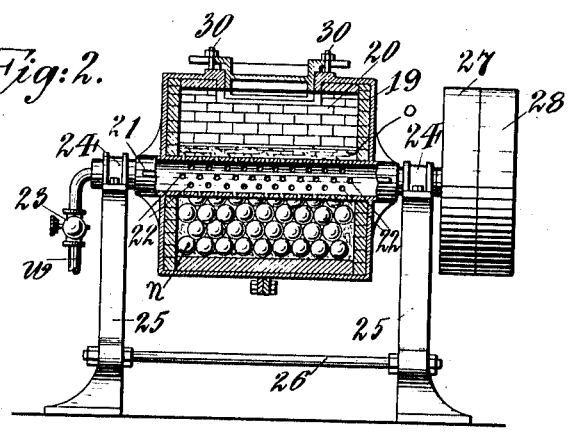
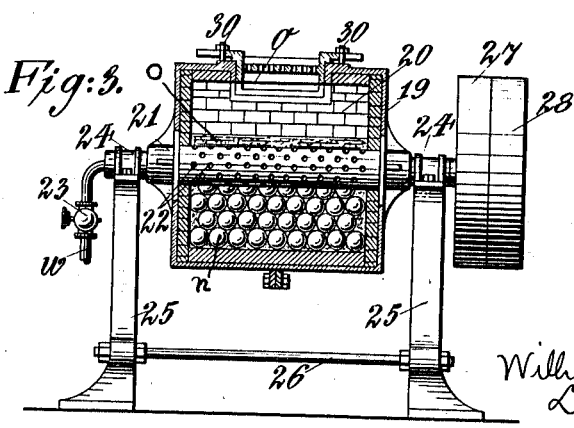

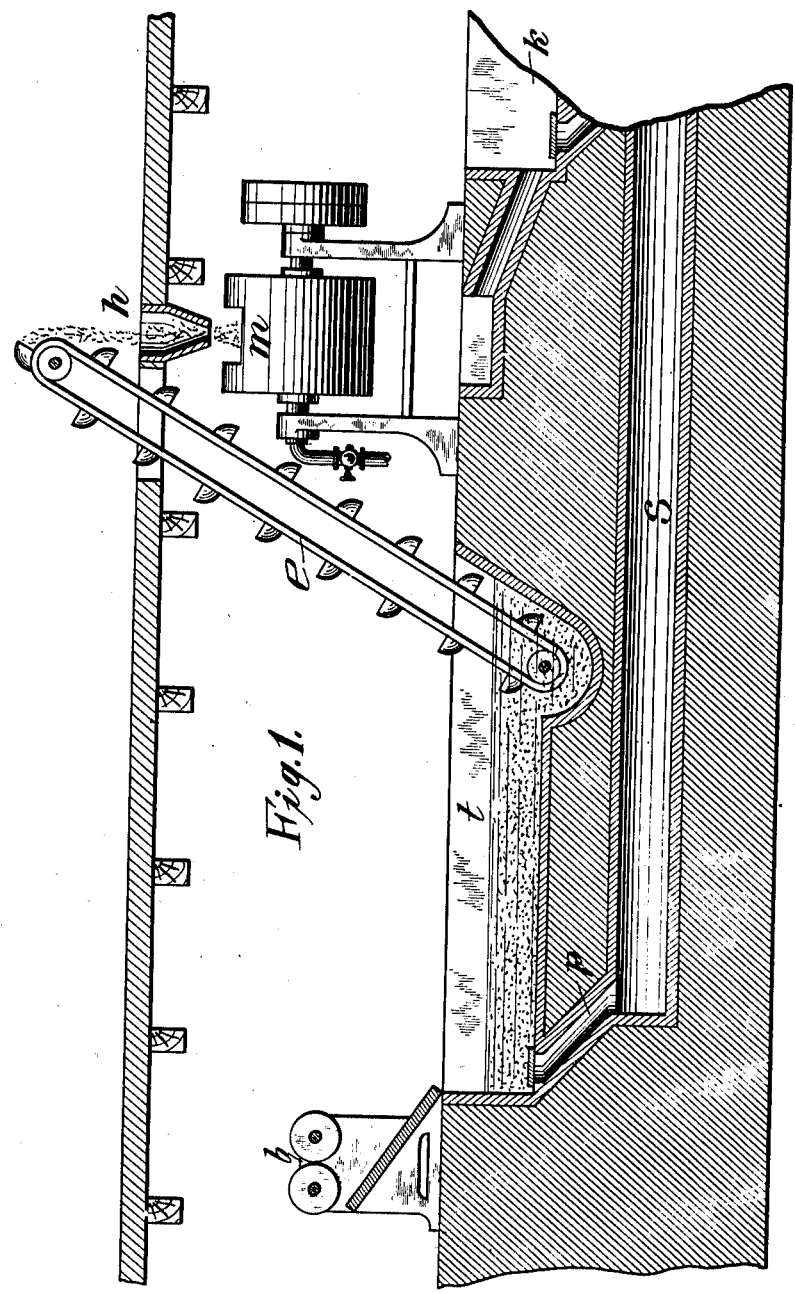

UNITED STATES PATENT OFFICE.

WILLIAM APPLETON LAWRENCE, OF NEW YORK, N. Y., ASSIGNOR TO INTERCONTINENTAL RUBBER COMPANY, A CORPORATION OF NEW JERSEY.

PROCESS OF SEPARATING RUBBER-LIKE GUM FROM ITS VEGETABLE SOURCE.

982,373.  Specification of Letters Patent.  Patented Jan. 24, 1911.

Application filed April 6, 1906. Serial No. 310,222.

*To all whom it may concern:*

Be it known that I, WILLIAM APPLETON LAWRENCE, a citizen of the United States, residing in the borough of Queens, city of New York, State of New York, have made certain new and useful Improvements in a Process of Separating Rubber-Like Gum from Its Vegetable Source, of which the following is a specification.

This invention relates to the process of separating rubber-like gum from plants, shrubs, bark or any vegetable source.

The object of the invention is more especially the extraction of gum from the guayule plant, found to grow extensively in Mexico; the botanical name of this plant is *Parthenium argentatum*.

The vegetable source should be first broken or divided and thrown into water to soak; it is next rubbed and pressed under water and for this purpose it is transferred to a moving inclosure containing water and a series of independent, hard surfaced bodies, such as pebbles; this inclosure, usually a closed cylinder, is rotated so that the attrition of the rolling hard surfaced, independent bodies, divides and macerates the source; in this inclosure after the gum is separated by the attrition it appears in the form of small, independent, vermiform parts or particles and rises through the water thus freeing itself from some of the wood and bark and also freeing itself more or less from the continued action of the hard surfaced bodies; in this way the gum is prevented from adhering to the wood and bark and to said bodies, and injury from too long continued action of the rubbing and pressing surfaces is prevented. After passing through this operation the rubber-like gum may be thrown into a skimming tank, and the lighter portion, almost entirely rubber gum, is skimmed off or it may be subjected to further operations.

The accompanying drawings illustrate the best way known to me for practicing my improved process.

Figure 1 is a side elevation of a form of apparatus which may be employed; Fig. 2 is a central section of a pebble mill; Fig. 3 is a similar view showing the perforated, hollow central shaft in full outline; Fig. 4 shows a gate or strainer through which the finely divided material is allowed to escape, and Fig. 5 is an elevation of the pebble mill.

In Fig. 1, there is a breaker $b$, that is, a machine which breaks the vegetable source. From breaker $b$ the material is passed into a tank $t$, known as a soaking tank, which is about half full of water and equipped with a pipe $p$ connecting with a sewer $s$. An elevator $e$ transfers the material from tank $t$ to hopper $h$ in an elevated position above the mill $m$. This mill $m$, preferably, consists of cylinder 19 lined with vitrified brick or tile 20; it has preferably a hollow shaft 21 with numerous perforations 22; a water supply pipe $w$ communicates with the interior of the shaft 21; this pipe is equipped with valve or shut-off 23. Shaft 21 is journaled at opposite ends in boxes 24 located on standards 25, united by brace 26; pulley 27 is fast on shaft 21; there is also a loose pulley 28. An opening $o$ is in cylinder 19, through which the material is introduced and when fine enough allowed to escape; there are clamps or holding devices 30 by which the cover $c$ is held in position, forming a water tight inclosure. The cover $c$ may be removed and a strainer $d$ fixed in position in the opening $o$; this strainer $d$ has a series of perforations $f$ through which the vermiform particles or pellets of rubber gum with any adhering fragments of wood or bark, if such there be, are allowed to escape.

The mill $m$ contains a large number of stones, pebbles or other hard and heavy bodies $n$, and there should be sufficient water $o$ in the mill to extend some distance above said bodies. Excellent results are attained by having the hard bodies $n$ not quite half filling the mill, and the water submerging said bodies and extending somewhat above that of the middle of the mill, or somewhat more than half filling the mill. The water may be admitted into the mill $m$ in any appropriate manner, as for example from the supply pipe $w$, and through the perforations 22 in the shaft 21. The material is introduced from elevator $e$, cover $c$ is clamped in position and cylinder 19 is rotated long enough to divide the material and separate the gum from the wood and bark, the gum then floats and is free from the further attrition. When the material reaches the required state of subdivision, the mill can then be stopped, and the rubber gum and other floating particles be skimmed from the surface of the water, or the strainer can be opened, and the mill $m$ slowly turned so that said rubber and floating particles can pass through the strainer. The rubber gum may then be further separated from the extraneous matters in a skimming tank, as shown at *k*, and then pressed or sheeted, in a well known manner.

What I claim and desire to secure by Letters Patent is:

1. The herein described process of removing rubber-like gum from its vegetable source after such source has been finely divided, consisting in rubbing said source in a body of water and below its surface to an extent sufficient to disconnect the gum from the rest of the source and thus causing said gum by its lesser specific gravity to rise to the surface away from the heavier part of said source.

2. The herein described process of removing rubber-like gum from its vegetable source after said source has been finely divided, consisting in rubbing said source between hard moving bodies in a body of water and below its surface, to an extent sufficient to disconnect the gum from the rest of the source and then causing the separated gum by its lesser specific gravity to rise to the surface away from the heavier part of said source.

3. The herein described process of removing rubber-like gum from its vegetable source after said source has been finely divided, consisting in separating the gum from said source by rubbing it between hard rolling bodies in a body of water and below its surface, and then causing the separated gum by its lesser specific gravity to rise to the surface away from the heavier part of said source.

4. The herein described process of removing rubber-like gum from its vegetable source after said source has been finely divided, consisting in separating the gum from said source by rubbing it between hard falling bodies in a body of water and below its surface, and then causing the separated gum by its lesser specific gravity to rise to the surface away from the heavier part of said source.

5. The herein described process of removing rubber-like gum from its vegetable source after said source has been finely divided, consisting in separating the gum from said source by rubbing it between hard falling and rolling bodies in a body of water and below its surface, and then causing the separated gum by its lesser specific gravity to rise to the surface away from the heavier part of said source.

WILLIAM APPLETON LAWRENCE.

Witnesses:
GEO. M. HARRIS,
EDWIN SEGER.